July 22, 1969   H. G. VORE   3,456,299
INJECTION MOLDING MACHINE
Original Filed June 27, 1966   2 Sheets-Sheet 1
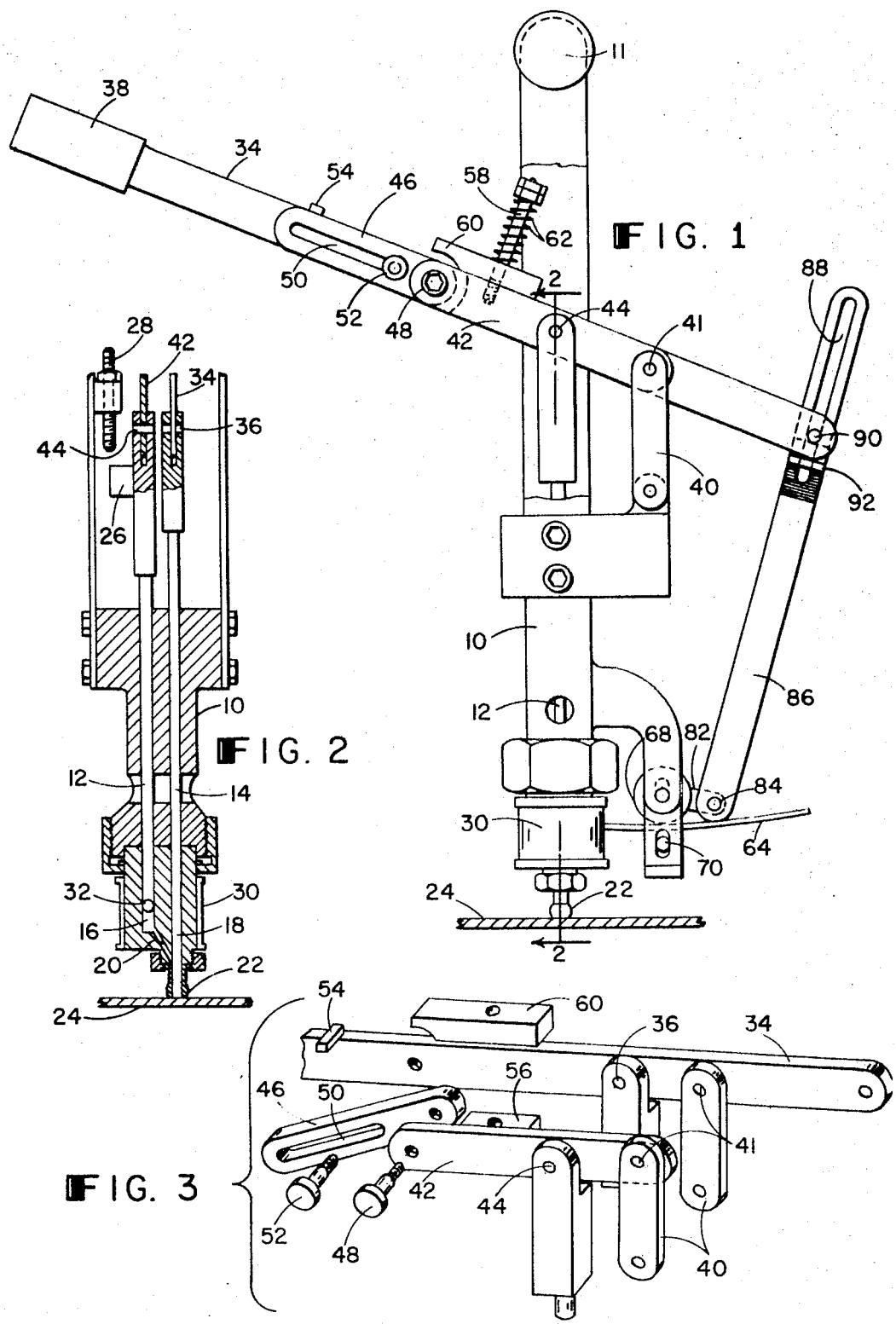

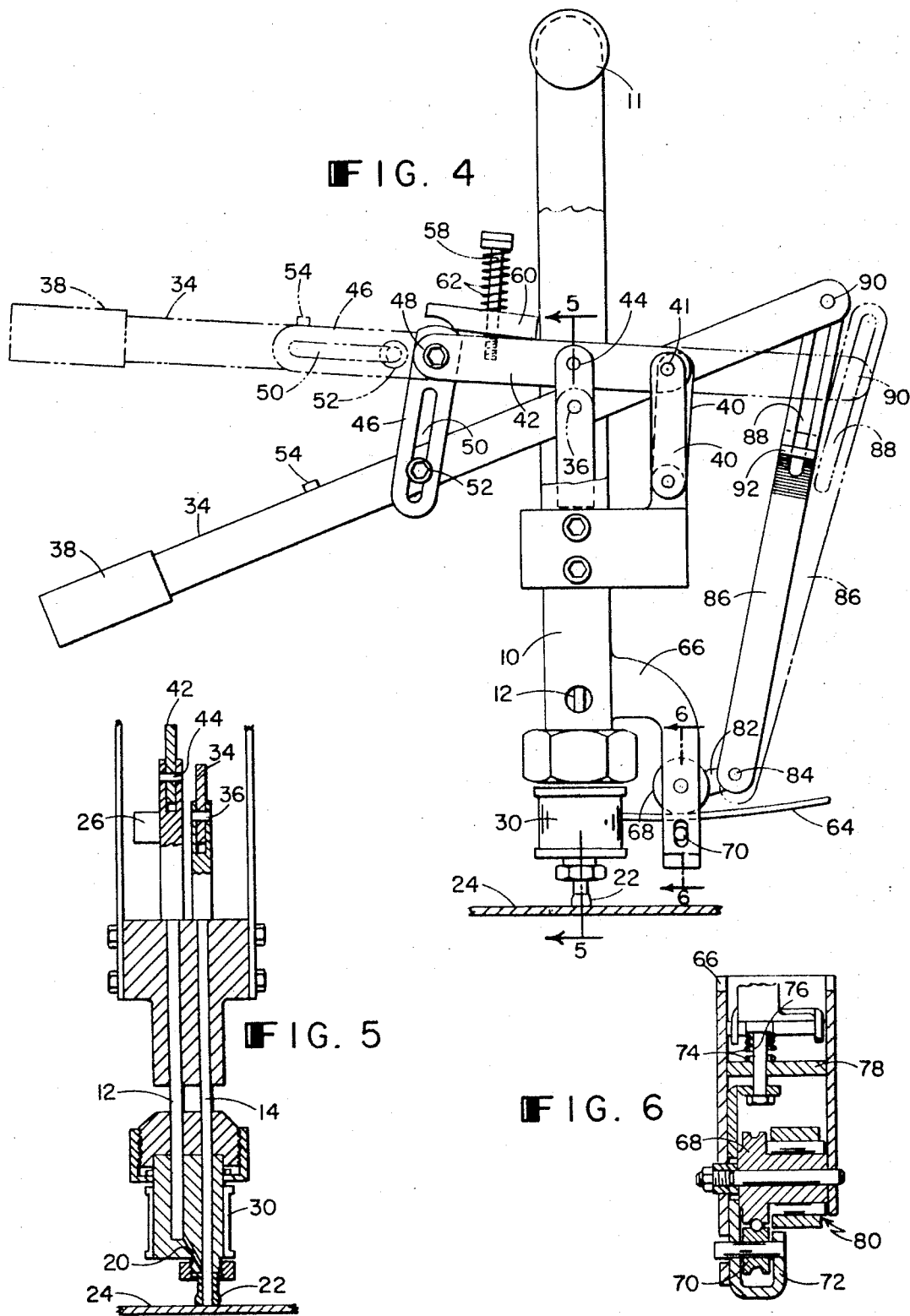

United States Patent Office 3,456,299
Patented July 22, 1969

3,456,299
INJECTION MOLDING MACHINE
Herbert George Vore, Nashua, N.H., assignor to Improved Machinery Inc., Nashua, N.H., a corporation of Delaware
Continuation of application Ser. No. 560,635, June 27, 1966. This application Feb. 9, 1968, Ser. No. 704,494
Int. Cl. B29f 1/06
U.S. Cl. 18—30                                    15 Claims

ABSTRACT OF THE DISCLOSURE

A portable injection molding machine having a plasticizing piston and an injection piston, both movable different distances by one lever stroke, and a feed mechanism automatically operative to feed plastic stock on the return portion of the lever stroke.

---

This application is a continuation of U.S. application Ser. No. 560,635, filed June 27, 1966, and now abandoned.

This invention relates to injection molding machines and more particularly to a portable injection molding machine particularly adapted for molding plastic fasteners in place.

An object of this invention is to provide a simple operating mechanism for a portable injection molding machine which will in a single operating stroke cause simultaneous movement over a predetermined distance of the required plasticizing and injection pistons and, then, movement of the injection piston an additional distance. Another object of this invention is to provide a simple stock feed mechanism which is automatically actuated on movement of the operating lever.

The invention provides a novel pair of levers independently pivotally connected to a pair of pistons of an injection molding machine. The levers are likewise pivoted to the housing. A breakaway link is slidably connected to the operating lever to which the injection piston is connected. The link is pivotally connected to the other or secondary lever. A stop extends from the operating lever to engage one edge of the link thus to prevent movement of the link in one direction only relative to the operating lever. Biasing means mounted on the secondary lever and engaging the link are provided to prevent movement of the link in the other direction relative to the operating lever until a predetermined level of pressure overrides the biasing means. As the operating lever is moved, the secondary lever is carried with it until the plasticizing piston has moved its predetermined distance. At this point additional pressure on the operating lever overrides the biasing means to permit additional movement of the operating lever and the injection piston.

Another feature of the invention is the feed mechanism. In general the feed comprises a pair of feed wheels between which the stock is fed. One of the feed wheels includes a one-way clutch. A drive arm extends from the clutch and is pivotally connected to a drive link. The drive link is slidably connected to the operating lever, the drive link having a slot through which extends a pin fixedly connected to the operating lever. The slot is of length less than the travel of the end of the operating lever carrying the pin and hence as the operating lever reaches each end of its movement, it drives the drive arm and, once in each full stroke of the operating lever, causes rotation of the feed wheels.

Other objects, features and advantages of this invention will be apparent to those skilled in the art from the following detailed description of a preferred embodiment thereof together with the accompanying drawings in which:

FIG. 1 is a side elevation of an injection molding machine embodying the invention;
FIG. 2 is a fragmentary sectional view along the line 2—2 of FIG. 1;
FIG. 3 is a fragmentary isometric view of elements of the invention;
FIG. 4 is a view similar to FIG. 1 of the machine in a position of operation;
FIG. 5 is a view similar to FIG. 2 along the line 5—5 of FIG. 4; and
FIG. 6 is a sectional view along the line 6—6 of FIG. 4.

The injection molding machine includes a housing 10 having a handle 11 and in which are positioned plasticizing piston 12 and injection piston 14 respectively in plasticizing and injection chambers 16, 18, as in FIG. 2. Chambers 16, 18 are interconnected by small diameter channel 20 sloping downwardly from chamber 16 to chamber 18. The ends of pistons 12, 14 have retracted positions predetermined distances above the openings of channel 20 into their respective chambers 16, 18. Chambers 16 terminates in a closed end at channel 20 but chamber 18 opens to nozzle 22.

Piston 12 is movable to the closed end of chamber 16 but piston 14 must move a greater distance to the work piece 24 at the end of nozzle 22. The retracted positions of pistons 12, 14 are adjustably controlled by stop 26 on piston 12 adapted to engage adjustable threaded member 28 on housing 10.

A heating element 30 is provided about chambers 16, 18 and a feed opening 32 is provided into chamber 16.

The levers for operating pistons 12, 14 are most clearly illustrated in FIGS. 1 and 3. An operating lever 34 is connected to injection piston 14 at a pivot 36 and has an operating handle 38 at one end thereof. Lever 34 is also connected via a pivot 41 to one of a pair of oscillating links 40 which in turn is pivotally connected to the frame 10. A secondary lever 42 is connected to plasticizing piston 12 at a pivot 44 coaxial in a retracted position of pistons 12, 14 pivot 36. Lever 42, like lever 34, is connected to another of the oscillating links 40 via a pivot 41.

Levers 34, 42 are interconnected by breakaway link 46. Link 46 is connected at pivot 48 to secondary lever 42 positioned to the other side of pivot 44 from pivot 41. Link 46 includes slot 50 therealong. Stationary threaded member 52 in operating lever 34 slidably interconnects lever 34 and link 46, member 52 being positioned in lever 34 at the end of slot 50 adjacent pivot 48 when levers 34, 42 are in a position causing retraction of pistons 12, 14.

Stop 54 on operating lever 34 positioned to the other side of member 52 from pivot 48 abuts the top edge of link 46 to limit the direction of movement of link 46 as it slides on member 52. Biasing means, bearing on a portion of the upper edge of link 46 which extends to the other side of pivot 48 from slot 50, prevents link 46 from moving from alignment with levers 34, 42 until a predetermined pressure overrides the biasing means, greater than that required to move links and pistons through the first portion of the actuating stroke thereof which moves piston 12 to the end of chamber 16. The biasing means comprises: a mounting block 56 on lever 42; shaft 58 extending from block 56; a pressure block 60 slidable on shaft 58 and overlying the portion link 46 to the other side of pivot 48 from slot 50; and a compression spring 62 on shaft 58 bearing down on block 60.

In operation handle 38 of lever 34 is depressed until piston 12 travels to ab t the end wall of chamber 16, the position shown in broken lines in FIG. 4. Plastic material, cut off by the advancing piston 12 in chamber 16, is heated by element 30 and is worked and plasticized as it is forced by piston 12 through channel 20 to chamber 18. Continued movement of lever 34 causes the biasing means to be overridden and link 46 to pivot about pivot 48. This permits operating lever 34 and piston 14 to move downwardly until piston 14 reaches the end of nozzle 22, FIGS. 4 and 5 at which time pivot 90 and the end of slot 88 cocks the feed mechanism. As operating lever 34 is raised, link 46 is restrained from movement to the other side of the lever 34 by stop 54. By moving lever 34 to the upper limit of its stroke, it functions to operate a stock feed mechanism to feed additional stock to chamber 16.

The stock to be fed to the machine through opening 32 is in the form of a rod 64. The feed mechanism therefor is mounted on an external extension 66 of frame 10. A drive wheel 68 is rotatably positioned on extension 66 in vertical alignment with opening 32. A driven wheel 70 is positioned adjacent drive wheel 68. The rod 64 is fed between the nip of wheels 68, 70 which is aligned with opening 32. To assure positive gripping of rod 64 and simple insertion thereof between wheels 68, 70, driven wheel 70 is mounted on a bracket 72 and biasing means, spring 74, are provided between a shaft 76 connected to the bracket 72 and a stationary member 78 for urging wheel 70 toward wheel 68.

Drive wheel 68 includes an axially extending portion thereof engaging a one-way clutch 80. Drive lever arm 82 is connected to the clutch and has a pivot 84 at the end thereof at which one end of a driving link 86 is pivotally connected. The other end of driving link 86 includes an elongated slot 88 and is slidably connected by pin 90 to a portion of operating lever 34 extending to the other side of pivot 41 from handle 38. The length of slot 88 is less than the distance traveled by pin 90 on actuation of operating lever 34. An adjustable stop 92 intermediate the lower end of slot 88 and lever 34 is provided to regulate the effective length of slot 88 and the sliding movement of pin 90 therein to control the amount of stock feed.

In operation the feed mechanism feeds as lever 34 through pin 90 engages stop 92 thus forcing link 86 and arm 82 downwardly to drive wheel 68 through clutch 80. The mechanism is primed to feed again on the down stroke of lever 34 when it engages the other end of slot 88 to lift link 86 and arm 82. As arm 82 is lifted, clutch 80 slips and wheel 68 remains stationary. To increase the amount of stock fed on each stroke of lever 34, slot 88 is shortened by moving stop 92 upwardly the desired distance. To decrease the feed stop 92 is moved downwardly.

Other embodiments of this invention will occur to those skilled in the art which are within the spirit and scope of the following claims.

What is claimed is:

1. A portable injection molding machine, comprising:
   a housing having means for receiving plastic material;
   a first piston, axially movable in said housing, for metering and plasticizing the received plastic material;
   a second piston, axially movable in said housing, for injection of the metered and plasticized material; and
   single stroke-actuation means for causing simultaneous movement of both said pistons a predetermined distance, and for independent movement of one of said pistons, sequentially, over a final additional distance.

2. A portable injection molding machine, according to claim 1, wherein:
   said second piston is movable said additional distance.

3. A portable injection molding machine, according to claim 1, wherein:
   said single-stroke actuation means comprise an operating lever coupled to, and movable relative said housing, having means coupling said first and second pistons thereto for movement therewith.

4. A portable injection molding machine, according to claim 3, wherein:
   said operating lever has coupled thereto first and second means constrained against one end of said first and second pistons, respectively, for causing said pistons to move said predetermined and additional distances, said first means being resiliently constrained.

5. A portable injection molding machine, according to claim 4, wherein:
   said first means further have means for automatically releasing the constraint thereof from said first piston as said lever commences that portion of said actuation which corresponds to said additional distance.

6. A portable injection molding machine, according to claim 3, wherein:
   said single-stroke actuation means further comprise a secondary lever, said operating and secondary levers being connected at first pivots to said housing and each independently connected respectively to said second, injection piston and to said first, plasticizing piston at adjacent second pivots;
   a link connected at a third pivot to said secondary lever, said link having a slot therein;
   a member fixedly connected to said operating lever and extending into and slidably engaging said slot, said member positioned at the end of said slot adjacent said third pivot with said levers parallel;
   a stop on one of said levers engaging said link for stopping movement thereof in one direction; and
   biasing means on said secondary lever engaging said link for stopping movement thereof in the other direction until an overriding pressure is exerted on said link through said operating lever;
   whereby on movement of said operating lever in said other direction, said piston will move simultaneously said predetermined distance and on continued movement of said operating lever, said biasing means will be overridden and said injection piston will move over the said additional distance while said plasticizing piston remains stationary.

7. The apparatus claimed in claim 6, in which said first, second and third pivots and said member are sequentially positioned respectively in first, second, third and fourth positions.

8. The apparatus claimed in claim 7, in which said second pivots are coaxial prior to movement of said operating lever in said other direction.

9. The apparatus claimed in claim 8 in which said first pivots are positioned remote from said housing on oscillating links, said oscillating links being pivotally connected at another pivot to said housing.

10. The apparatus claimed in claim 9 in which said stop is positioned to the one direction side of and on said operating lever at a portion of said link remote from said pivots and said member, and said biasing means engages the one direction side of said link at a portion thereof intermediate said second and third pivots.

11. The apparatus claimed in claim 6 including a feed mechanism comprising:
   a drive wheel and an adjacent driven wheel having a nip therebetween aligned with an opening in said housing;
   means connected to said drive wheel for moving said drive wheel at said nip only toward said opening regardless of the direction of movement of said means;
   a drive arm connected to said means;
   a drive link pivotally connected to said arm, said drive link having a slot therein;
   another member fixedly connected to said operating lever and extending into and slidably engaging said slot, said slot being of smaller length than the distance traveled by said other member on movement of said operating lever.

12. The apparatus claimed in claim 11 including means for adjusting the length of said slot in said drive link.

13. The apparatus claimed in claim 12 in which said first, second, and third pivots and said member are sequentially positioned respectively in first, second, third, and fourth positions.

14. The apparatus claimed in claim 13 in which said other member is positioned on a portion of said operating lever on the side of said first pivot remote from the others of said pivots.

15. The apparatus claimed in claim 1 including said housing and pistons and further including separate chambers in said housing in which said pistons are positioned and a tubular opening angularly inclined from the chamber in which said plasticizing piston is positioned to said other chamber, connecting said chambers, said pistons each spaced a predetermined distance from the entrance of said opening into their respective chambers.

References Cited

UNITED STATES PATENTS

| | | |
|---|---|---|
| 422,655 | 3/1890 | Swan. |
| 2,193,832 | 3/1940 | Morin et al. |
| 2,271,063 | 1/1942 | De Mattia. |
| 2,465,889 | 3/1949 | Lester et al. |
| 2,578,105 | 12/1951 | Taylor. |
| 3,221,373 | 12/1965 | Kwan. |

WILBUR L. McBAY, Primary Examiner

U.S. Cl. X.R.

18—3.5